United States Patent [19]
McConnell et al.

[11] Patent Number: 6,108,307
[45] Date of Patent: Aug. 22, 2000

[54] FRAME RELAY PRIORITY QUESES TO OFFER MULTIPLE SERVICE CLASSES

[75] Inventors: Stephen M. McConnell; Tavener G. T. Bremner, both of Kanata, Canada

[73] Assignee: Newbridge Networks Corporation, Kanata, Canada

[21] Appl. No.: 08/989,687

[22] Filed: Dec. 12, 1997

[51] Int. Cl.[7] .............................. H04L 12/56; H08C 15/00
[52] U.S. Cl. ............................................. 370/235; 370/412
[58] Field of Search ..................................... 370/235, 229, 370/237, 412, 415, 416, 417, 418, 462, 389, 395, 477, 252; 340/825.03, 825.5, 825.51

[56] References Cited

U.S. PATENT DOCUMENTS

| | | | |
|---|---|---|---|
| 5,359,592 | 10/1994 | Corbalis et al. | 370/233 |
| 5,367,523 | 11/1994 | Chang et al. | 370/235 |
| 5,446,733 | 8/1995 | Tsuruoka | 370/232 |
| 5,638,359 | 6/1997 | Peltola et al. | 370/229 |
| 5,757,771 | 5/1998 | Li et al. | 370/235 |
| 5,828,653 | 10/1998 | Goss | 370/230 |
| 5,862,126 | 1/1999 | Shah et al. | 370/230 |
| 5,872,769 | 2/1999 | Caldara et al. | 370/230 |
| 5,910,942 | 6/1999 | Grenot et al. | 370/236 |
| 5,923,656 | 7/1999 | Duan et al. | 370/395 |
| 5,956,342 | 9/1999 | Manning et al. | 370/414 |
| 5,959,993 | 9/1999 | Varma et al. | 370/397 |

*Primary Examiner*—Seema S. Rao
*Attorney, Agent, or Firm*—Blake Cassels & Araydon LLP

[57] ABSTRACT

There is provided a message service device for a switching network. The device provides an input port for receiving messages from a number of network connections. The device includes a storage device for storing a number of predetermined priority levels pertaining to the received messages, one of the priority levels being assigned to each of the network connections. A number of first-in first-out message queues are provided for storing the received messages. The queues respectively correspond to each of the predetermined priority levels. Each queue is associated with at least one of a number of predetermined congestion thresholds whereby a congestion severity status may be determined for each queue. The congestion severity status corresponds proportionally to the number of the congestion thresholds which have been exceeded by the queue. The message service device further provides a processor for determining the network connection associated with each of the received messages. The processor allocates each of the messages to the tail of a corresponding one of the queues based upon the priority level assigned to the determined network connection and supplied to the processor from the storage device. A server for the arbitration of message frames from the queues is also provided. The server determines the congestion severity status for each of the queues prior to selecting a message from the queues. The server selects the message from the head of the queue which has the highest congestion severity status where only one queue has such status and from the queue corresponding to the highest priority level where more than one queue has such status. The message service device provides an output port for dispatching messages selected from the queues by the server.

20 Claims, 5 Drawing Sheets

FRAME RELAY PRIORITY QUESES TO OFFER MULTIPLE SERVICE CLASSES

FIELD OF THE INVENTION

The present invention relates generally to switching networks and to the congestion management of such networks. More particularly, the invention relates to an apparatus and method for the allocation of messages into multiple queues according to a predetermined priority associated with each such message, and for the service arbitration of queued messages according to the current congestion severity status of each of the queues.

BACKGROUND OF THE INVENTION

Switching networks based on Frame Relay transmission techniques have seen widespread use and acceptance since the first networks utilizing this technology were established in the early 1990's. Frame Relay messaging employs variable-length packet switching that is particularly well suited for the transmission of bursty data. For example, Frame Relay networks are often used to transmit data from one LAN (Local Area Network) to another LAN over a WAN (Wide Area Network). Other applications of this technology include SNA migration, remote access connections and Internet connectivity.

Any networking device which offers Frame Relay connections must be able to combine several virtual connections on the same bandwidth so that statistical multiplexing gains can be achieved when traffic bursts do not overlap. It is a further requirement of such devices that some network connections will be recognized to receive a better quality of service or class of service than other network connections, such that when network congestion occurs, the data associated with superior class of service connections are transmitted by the device before the data associated with inferior class of service connections. Yet another requirement of such devices is that delays experienced on all network connections during periods of congestion be precisely monitored and controlled.

It has been known to employ various techniques of priority queuing of network frames based on known class of service parameters. For instance, a priority queuing scheme known as exhaustive round robin is often used for congestion management. This known method is problematic in that it offers no control over delays experienced during periods of congestion unless complex connection admission algorithms are employed, for instance real time feedback. This known technique also has poor scalability when greater than two different levels of class of service must be supported.

Another prior art queuing scheme known as time-stamped weighted fair queuing is sometimes used for congestion management applications. This particular method, like the exhaustive round robin priority queuing scheme discussed above, also suffers from offering no control over delays encountered during periods of congestion unless complex connection admission algorithms are employed. Further, this prior art method is disadvantageous in that it may allocate bandwidth to low quality of service connections, even in situations when high quality of service connections are suffering unacceptable transmission delays.

With some of the congestion control mechanisms known in this art, congestion thresholds for priority queues are set in terms of bytes and simply use the queue depth to decide when to discard message frames. While this method may be adequate when a single queue is implemented per connection stream, the mechanism suffers from two problems when applied to multiple priority queues. The first problem is that bandwidth is wasted if a stale message frame is transmitted. This may occur, even with weighted length priority queuing algorithms, if the low priority traffic is sparse. It can then take a long time before the low priority queue fills up enough to get any service, by which time the frame at the head of the low priority queue will be stale. The second problem is that where there is just one queue, there is a direct correspondence between setting a congestion threshold in bytes and the delay. In other words, the delay experienced by a frame when the queue is at a particular threshold is equal to the threshold divided by the stream rate. However, this correspondence is lost when there are several multiple priority queues sharing a bandwidth.

There is therefore a need for a method of multiple priority queuing which ensures that data on network connections which have a superior quality of service are transmitted before data on connections with an inferior quality of service. There is also a need for a method of priority queuing which achieves the foregoing advantage while allowing for the monitoring and control of delays experienced on all network connections.

Accordingly, it is an object of the present invention to provide a method of priority queuing which achieves these requirements and overcomes some of the problems and shortcomings associated with known schemes of priority queuing. This and other objects of the present invention will be made apparent in the detailed description of embodiments of the invention which follows.

SUMMARY OF THE INVENTION

According to one broad aspect of the present invention, there is provided a message service apparatus for a switching network, the message service apparatus comprising: (a) an input port for receiving messages from a plurality of network connections; (b) a plurality of message queues for storing said received messages, the queues respectively corresponding to each of a plurality of predetermined priority levels pertaining to said received messages, one of said priority levels being assigned to each of said network connections, each queue having associated therewith at least one of a plurality of predetermined congestion thresholds whereby a congestion severity status may be determined for each queue, the congestion severity status corresponding proportionally to the number of said congestion thresholds which have been exceeded by the queue; (c) a processor for determining the network connection associated with each of said received messages, and for allocating each of said messages to a corresponding one of said queues based upon the priority level assigned to said determined network connection; (d) a server for the arbitration of messages from said queues, the server determining said congestion severity status for each of said queues prior to selecting a message therefrom, the server selecting said message from the queue having the highest congestion severity status where only one queue has such status and from the queue corresponding to the said highest priority level where more than one queue has such status; and (e) an output port for dispatching said messages selected from the queues by said server.

According to another broad aspect of the present invention there is provided a method for servicing messages received from a plurality of network connections, the method comprising the steps of (a) determining the network connection associated with each of said received messages; (b) allocating each of said received messages to a corresponding one of a plurality of message queues, the queues respectively corresponding to each of a plurality of predetermined priority levels pertaining to said received messages, one of said priority levels being assigned to each of said network connections, each queue having associated therewith at least one of a plurality of predetermined congestion thresholds, the received messages being allocated to said corresponding one of said queues based upon the predetermined priority level assigned to said determined network connection; (c) determining a congestion severity status for each of said queues prior to each dispatch of a message therefrom, the congestion severity status corresponding proportionally to the number of said congestion thresholds which have been exceeded by the queue; (d) selecting a message from the queue having the highest congestion severity status where only one queue has such status and from the queue corresponding to the said highest priority level where more than one queue has such status; and (e) dispatching said selected message from the queue.

According to yet another broad aspect of the present invention, there is provided an apparatus for servicing messages received from a plurality of network connections in a switching network, the apparatus comprising: (a) means for determining the network connection associated with each of said received messages; (b) means for allocating each of said received messages to a corresponding one of a plurality of message queues, the queues respectively corresponding to each of a plurality of predetermined priority levels pertaining to said received messages, one of said priority levels being assigned to each of said network connections, each queue having associated therewith at least one of a plurality of predetermined congestion thresholds, the received messages being allocated to said corresponding one of said queues based upon the predetermined priority level assigned to said determined network connection; (c) means for determining a congestion severity status for each of said queues prior to each dispatch of a message therefrom, the congestion severity status corresponding proportionally to the number of said congestion thresholds which have been exceeded by the queue; (d) means for selecting a message from the queue having the highest congestion severity status where only one queue has such status and from the queue corresponding to the said highest priority level where more than one queue has such status; and (e) means for dispatching said selected message from the queue.

BRIEF DESCRIPTION OF THE DRAWINGS

By way of illustration and not of limitation, preferred embodiments of the present invention will next be described with reference to the following drawings, in which.

DETAILED DESCRIPTION OF THE PREFERRED EMBODIMENT

Figure 1:
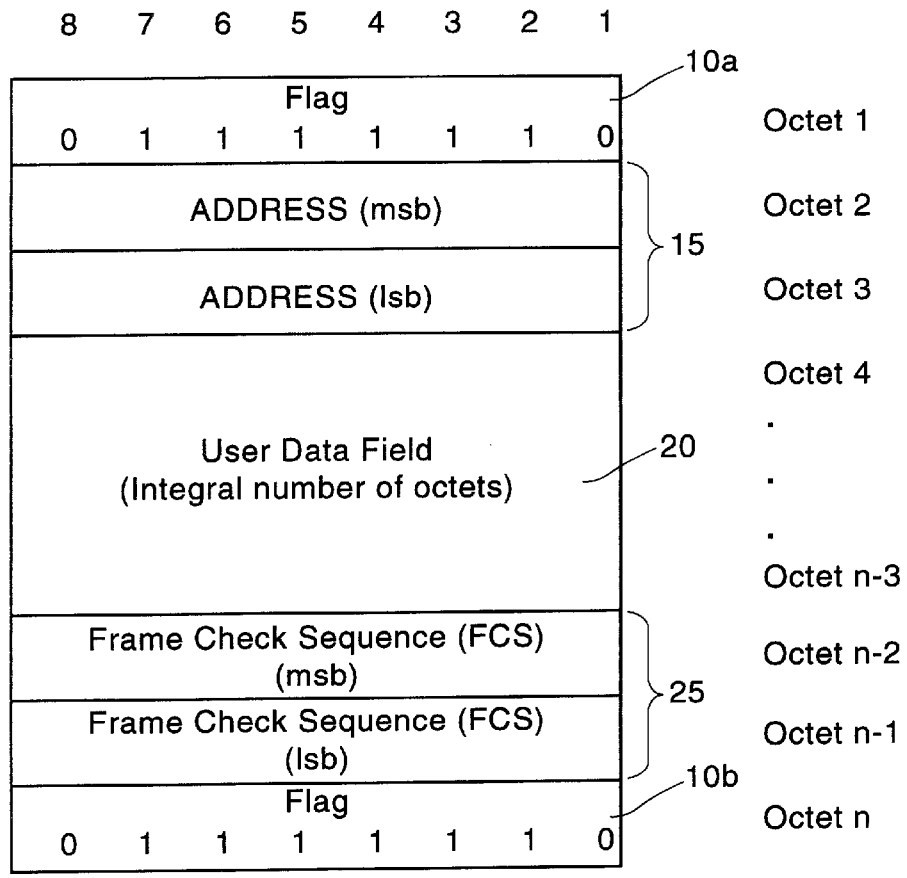
FIG. 1 is a representation of a standards defined format for a typical Frame Relay message frame.
Figure 2:
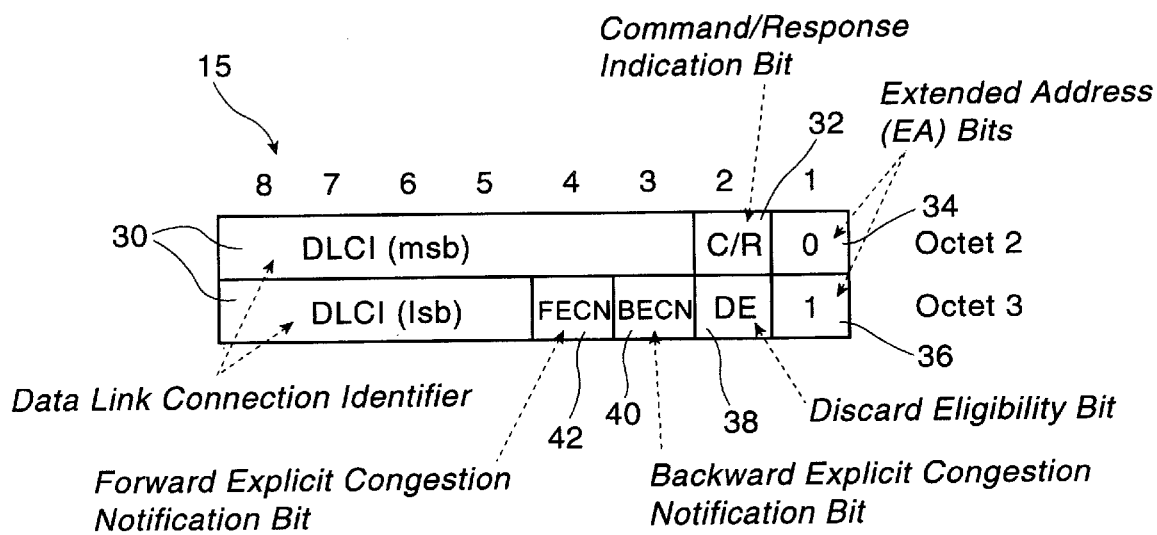
FIG. 2 is a more detailed representation of an address field format within the message frame of FIG. 1.

With reference to FIG. 1, the format of a Frame Relay message frame according to known standards consists of opening and closing flags 10a and 10b, a two-byte address field 15, a data field 20 of variable length, and a two-byte checksum field 25. As shown in FIG. 2, the address field 15 of the Frame Relay message format consists of two octets. A Data Link Connection Identifier (DLCI) 30 consists of the 6 most significant bits of the first octet and the 4 most significant bits of the second octet, concatenated to form a 10-bit value. The Command/Response Indication (C/R) bit 32 is not used by the Frame Relay data link protocol and may be set to any value by the user device. Thus, the CIR bit is carried transparently by the Frame Relay network. The Extended Address (EA) bits 34, 36 are used to delimit the address field 15. The EA bit 34 in the first octet of the field is set to 0 and the EA bit 36 in the second octet of the field is set to 1.

Three bits in the address field 15 are of particular importance for congestion management and control purposes. The Discard Eligibility (DE) bit 38 is set to a value of 1 to indicate a request that a frame should be discarded in preference to other frames in a congestion situation, whenever such frames must be discarded to ensure safe network operation and maintain a committed level of service within the network. The Backward Explicit Congestion Notification (BECN) bit 40 may be set by a congested network to notify the user that congestion avoidance procedures should be initiated for traffic in the opposite direction of the transmitted frame. The BECN bit is set to 1 to indicate to the receiving user device that the frame it transmits may encounter congested resources. This bit may therefore be used with source-controlled transmitter rate adjustment schemes. Lastly, the Forward Explicit Congestion Notification (FECN) bit 42 may be set by the congested network to notify the user that congestion avoidance procedures should be initiated for traffic in the direction of the transmitted frame. The FECN bit is set to 1 to indicate to the receiving user device that the frames it receives have encountered congested resources. This bit may be used with destination-control transmitter rate adjustment schemes.

Service class parameters for Frame Relay networks have been adopted as industry standards. These service class parameters include the Committed Information Rate (CIR), the Committed Burst Size (Bc) and the Excess Burst Size (Be), all of which are defined in the ANSI T1.606 and CCITT 1.233.1 standards, well-known to those skilled in this art. The CIR is the guaranteed minimum throughput between two end user devices over a Frame Relay network during normal operating conditions. The Bc, on the other hand, defines the maximum number of bits of user data that the network commits to transfer during normal operating conditions for a specified time interval known as the Committed Rate Measurement Interval (Tc). Lastly, the Be defines the maximum number of bits of uncommitted user data in excess of Bc that the network will attempt to transfer over the Tc. The Be parameter allows network customers to transmit bursts of data above their assigned CIR for critical traffic loads, and is usually equal to the full speed of the access link.

The Tc parameter is calculated as the ratio Bc/CIR and is the time interval over which the user may transfer Bc bits of committed data, or Bc+Be bits of uncommitted data. It is not a periodic measurement interval, but rather a sliding window used to measure the rate of incoming data. By way of example, a connection may transmit the maximum of Bc bits over a time interval of Tc seconds. This defines the CIR parameter for the connection. Under normal conditions, then, the connection is guaranteed this rate of throughput. A connection may also transmit a burst in excess of its CIR provided the total number of bits transmitted over Tc seconds is not more than Be+Bc. The Discard Eligibility (DE) bit 38 is set in message frames transmitted within the Bc to Be range. This notifies downstream network devices that, should they experience congestion, these frames may be discarded. Higher level network protocols detect the DE bit and take care of retransmission. If the end user device must transmit more than Bc+Be bits, all affected frames are immediately discarded. End user and network devices can pass congestion notification information to higher level network protocols that may initiate flow control or rerouting to relieve congested resources.

When the traffic load applied to a Frame Relay networking device exceeds its capacity, the device buffers the message frames. Normally, the degree of congestion is measured in terms of buffer utilization, such that the higher the utilization, the greater the congestion. Three congestion thresholds are recognized under ANSI T1.606 and CCITT I.370 standards, well-known to those skilled in this art. The three thresholds are identified in the standards as Mild Congestion Threshold (MCT), Severe Congestion Threshold (SCT) and Absolute Congestion Threshold (ACT). These congestion thresholds determine when the FECN and BECN bits are set to avoid congestion. During mild congestion as defined by the MCT, a Frame Relay device sets the FECN and BECN bits of message frames that are queued for transmission. No frames are discarded. During severe congestion as defined by the SCT, the Frame Relay device sets the FECN and BECN bits as during mild congestion and begins discarding frames identified with a DE bit. When the network reaches the absolute congestion condition as defined by the ACT, the Frame Relay device discards all newly arriving frames and raises a congestion alarm. The MCT, SCT and ACT parameters can each typically be configured at the frame stream level. At the switch level, however, typically only the MCT and SCT parameters are user-configurable since the ACT parameter, which is based on total switch capacity, cannot be changed.

Figure 3:
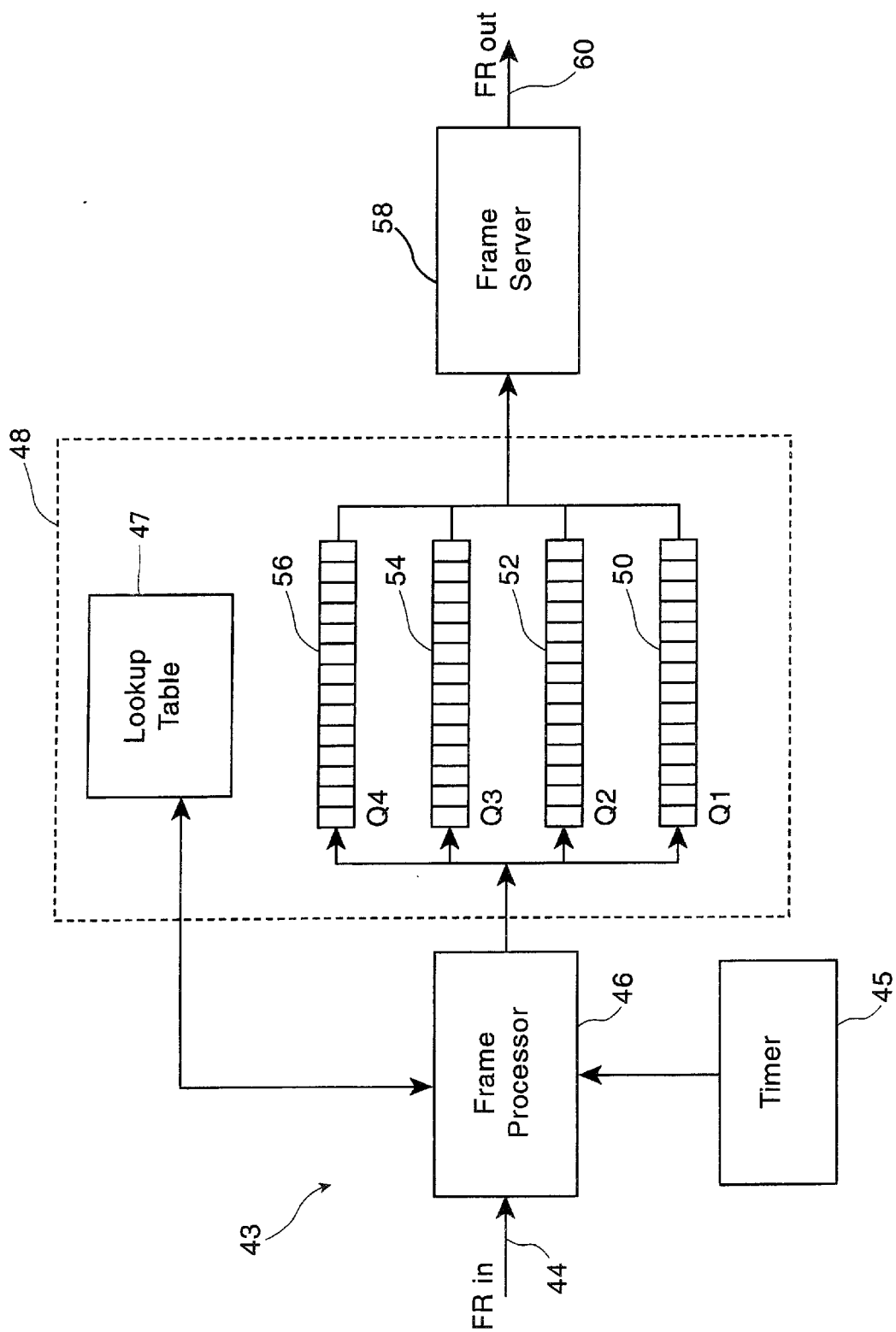
FIG. 3 is a schematic block diagram representation of a frame service device according to an embodiment of the apparatus of the present invention.

Turning now to FIG. 3, a frame service device 43 according to a preferred embodiment of the apparatus of present invention is established before a congestion point of a Frame Relay network. The frame service device provides a frame processor 46 having a frame input port 44. The frame processor 46 receives each message frame from the network via the frame input port 44. When a frame arrives, the frame processor reads the DLCI bits 30 in address field 15 of the frame message. The frame processor accesses a lookup table 47 located in memory space 48 in order to assign a predetermined priority level for a message having the DLCI of the message received by the frame processor 46.

As explained in greater detail below, the various predetermined priority levels found in lookup table 47 will each correspond to a respective first-in first-out (FIFO) queue 50, 52, 54, 56 of memory space 48. Preferably, each of these queues is of fixed length. The frame processor 46 places the received frame into the tail of one of the queues 50, 52, 54, 56 according to its associated priority level provided by lookup table 47. Before the received frame is assigned to a queue by frame processor 46, the frame is time stamped with time information received from timer 45, as is well-known to those skilled in this art. Each of queues 50, 52, 54, 56 is channelled to frame server 58. Whenever the frame server is ready to dispatch another frame to its associated frame output port 60, the frame server will accept the message frame from one of the queues 50, 52, 54, 56 having the highest or most urgent congestion status, as explained in greater detail herebelow.

Figure 4:
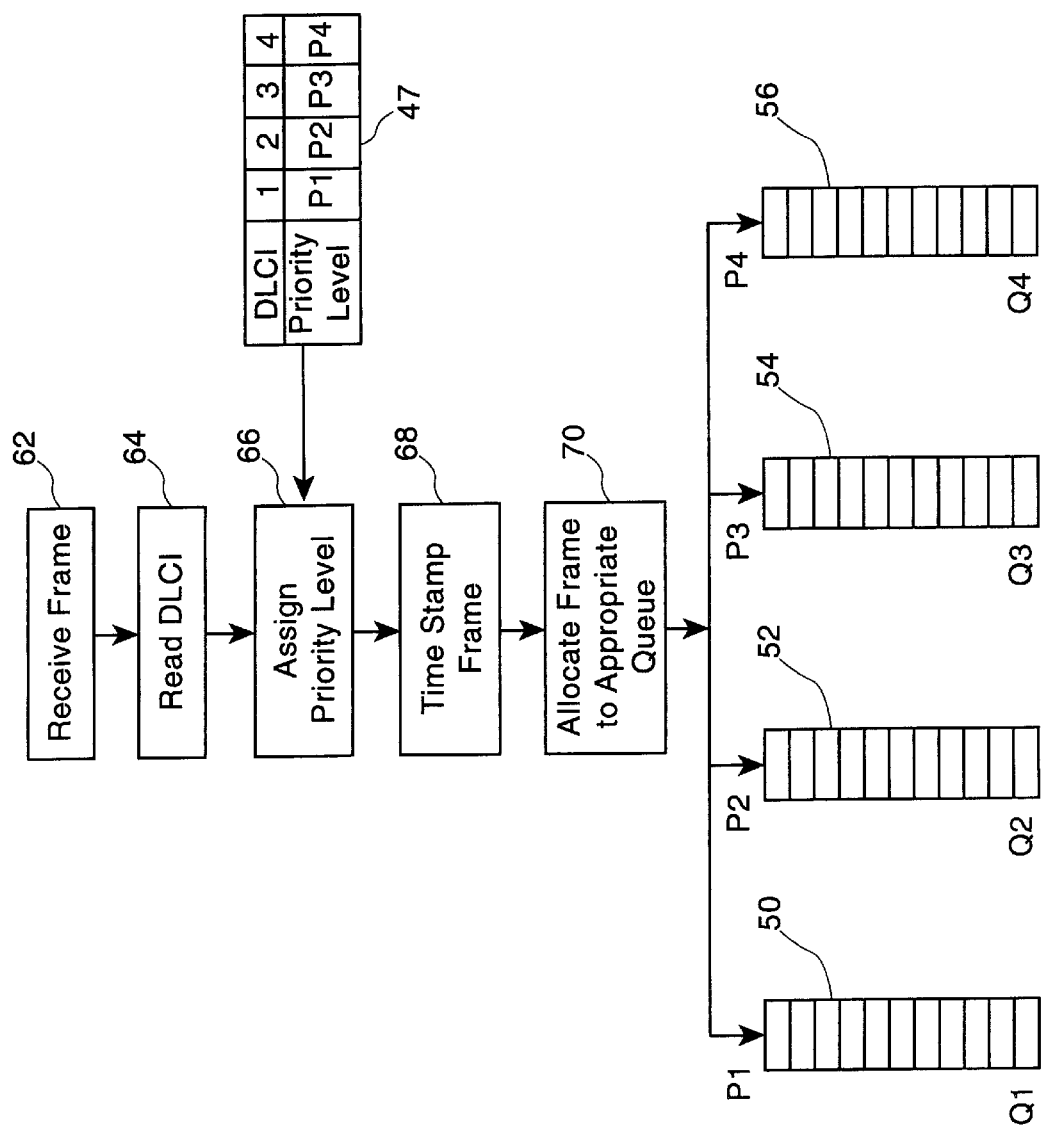
FIG. 4 is a flowchart showing the frame reception and frame allocation steps of multiple priority queuing according to an embodiment of the method of the present invention.

With reference to FIG. 4, an algorithm for receiving and allocating Frame Relay messages to the appropriate queue of frame service device 43 will next be described. In step 62, frame processor 46 receives a frame via frame input port 44. Next, the DLCI of the received frame is read at step 64. A priority level in the range P1 to P4 is assigned to the frame at step 66 by reference to lookup table 47. At step 68, the received frame is time stamped. Lastly, at step 70 the received frame is directed to an appropriate queue Q1 through Q4 based on its assigned priority level P1 through P4.

As explained previously, the number of queues implemented in the frame service device 43 will reflect the number of service class priority levels to be handed by the congestion management scheme. The priority level s may be arbitrarily assigned from low to high, or may be predetermined to reflect or map to quality of service parameters associated with an ATM backbone network. In the preferred embodiment of the frame service device described above, four queues are implemented, which each correspond to a particular class of service associated with the virtual connections of the network node to which the frame processing apparatus 43 pertains. For instance, the queues 50, 52, 54, 56 may respectively represent high priority, medium priority, low priority and best effort priority levels, respectively. The high priority level will be associated with Frame Relay connections whose service class will only be permitted to degrade last if congestion occurs. The best effort priority level pertains to Frame Relay connections whose service class will be permitted to degrade first if network congestion occurs. The intermediate priority levels will therefore relate to Frame Relay connections having intermediate service classes. Where the Frame Relay connections are mapped to equivalent quality of service parameters on an ATM backbone, the medium priority level may be associated with Frame Relay connections which will use a non-real time Variable Bit Rate (nrt-VBR) quality of service, if available. Similarly, the low priority level may be associated with a Frame Relay connection utilizing an Available Bit Rate (ABR) quality of service on the backplane, if available. In whatever manner the priority levels are assigned to the various Frame Relay connections for a node, the assigned priority levels are stored in lookup table 47 of frame processing apparatus 43.

Each of the queues 50, 52, 54, 56 which reflects a predetermined priority level has congestion thresholds applied to it. The congestion thresholds need not be the same for each of the queues. In the preferred embodiment, three congestion thresholds are specified for each queue. The first threshold is the mild congestion threshold (MCT), whereby the explicit congestion notification bits (BECN and FECN) will be set in the Frame Relay header of all dispatched frames. The second threshold is the severe congestion threshold (SCT), whereby all discard eligible traffic having the DE bit set in the Frame Relay header will be discarded from the queue. The third and final congestion threshold is the absolute congestion threshold (ACT), whereby no additional frames will be accepted into a queue while it is absolutely congested.

The three congestion thresholds may be specified by the user as time delays. When defined in this manner, namely by units of time, the congestion thresholds are characterized as delay congestion levels. Equivalent depth congestion thresholds may be computed for each queue by multiplying the applicable delay congestion threshold by the access rate (AR) for the queue. For example, if a ten millisecond threshold is required on a T1 access stream, the associated depth congestion threshold will be computed as follows:

Depth Threshold=0.01 sec*1536000 bits/sec=15,360 bits

The congestion severity status of each queue is determined whenever the frame server 58 is ready to dispatch a frame from the head of the queues. In the preferred embodiment of the present invention, the congestion severity status is defined by two components, namely a depth severity component and an age severity component.

The congestion severity status for a queue is determined as the highest severity status pertaining to either of the depth severity component or the age severity component associated with that queue. Thus, if the depth severity component has a higher severity than the age severity component, the former defines the congestion severity status for the queue. However, if the depth severity component has a lower severity than the age severity component, the latter defines the congestion severity for the queue. If both the depth and age severity are the same, that severity is equated to the congestion severity component for the queue.

The depth severity component for a queue is determined by comparing the current depth of the queue with the three depth congestion thresholds applied to the queue. The greater the number of applied depth congestion thresholds which have been exceeded by the current measure of queue depth, the greater the depth severity. Where depth congestion thresholds have been applied as previously explained, a colour scheme as follows may be employed to denote depth severity:

| Depth Severity | Depth Status |
| --- | --- |
| Green (Low) | The current queue depth is less than the MCT depth congestion level. |
| Yellow (Mid) | The current queue depth is greater than or equal to the MCT depth congestion level but less than the SCT depth congestion level |
| Red (High) | The current queue depth is greater than or equal to the SCT depth congestion level. |

The age severity component for a queue is determined by comparing the current age of the message frame at the head of the particular queue, calculated according to its time stamp information previously described, with the three age congestion thresholds applied to the queue. The greater the number of applied age congestion thresholds which have been exceeded by the current measure of age for the message frame, the greater the age severity for the queue. Where age congestion thresholds have been applied as previously explained, a colour scheme as follows may be employed to denote depth severity:

| Age Severity | Age Status |
| --- | --- |
| Green (Low) | The current age of the message frame at the head of the queue is less than the MCT age congestion level. |
| Yellow (Mild) | The current age of the message frame at the head of the queue is greater than or equal to the MCT age congestion level but less than the SCT age congestion level. |
| Red (High) | The current age of the message frame at the head of the queue is greater than or equal to the SCT age congestion level. |

Accordingly, in the preceding examples, the congestion severity status for a queue will result in a determination of Red (or High) if either or both of the depth severity and age severity is Red (or High); a determination of Yellow (or Mid) if neither depth severity or age severity is Red (or High) and either or both are Yellow (or Mid); and a determination of Green (or Low) if every depth severity and age severity is Green.

Figure 5:
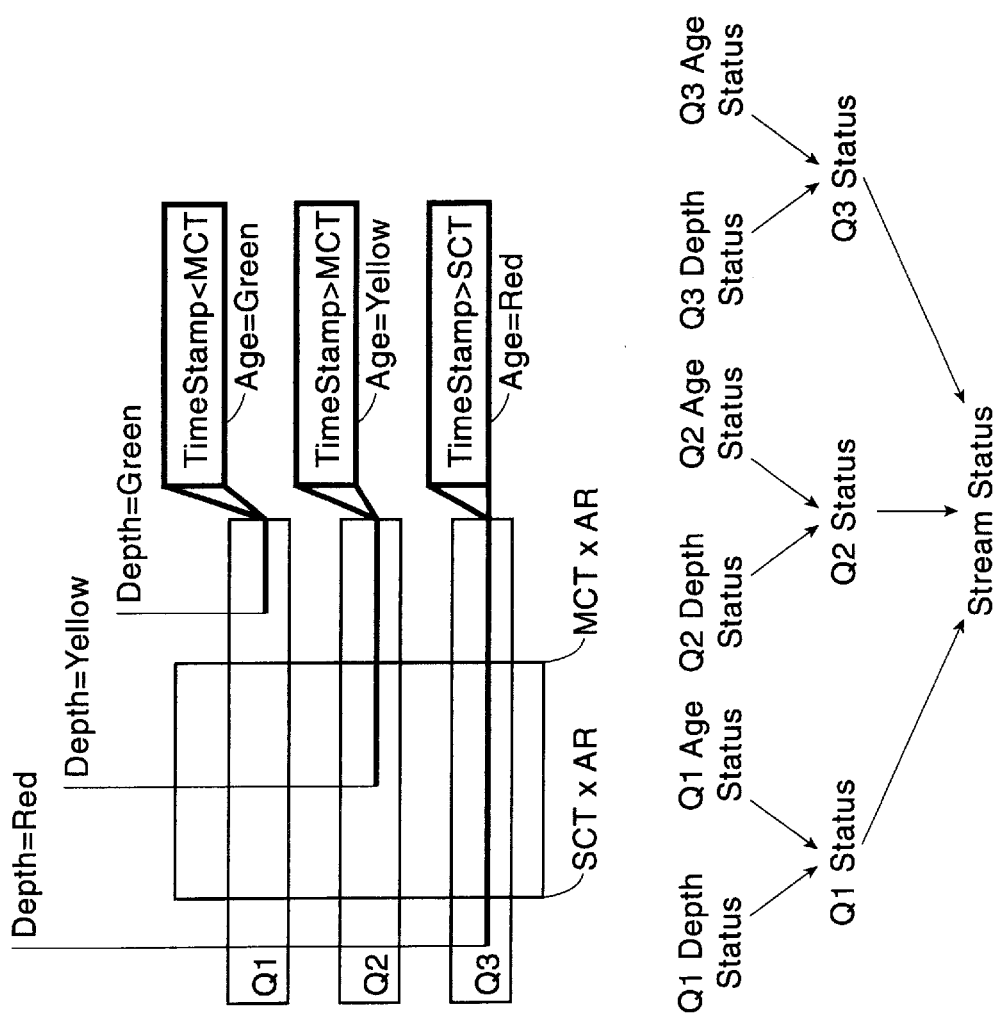
FIG. 5 is a schematic representation of three message queues, showing their associated delay congestion thresholds and depth congestion thresholds, and further showing the interrelationships among depth status and age status for each queue, queue congestion severity and stream congestion severity.

In addition to the congestion severity pertaining to each individual queue of the frame service device 43, it is also useful, for instance for congestion control purposes, to determine the stream congestion severity for the entirety of the queues. The stream congestion severity is defined to be the highest congestion severity pertaining to any of the individual queues forming a stream. The concepts of depth severity or status, age severity or status, queue congestion severity or status and stream severity or status, together with their various interrelationships, are shown in FIG. 5 for a scheme of three priority queues. The use of stream congestion severity for effecting congesting control is discussed in greater detail below.

Once the congestion severity status for each queue has been determined in the manner outlined above, queue service arbitration by the queue server is determined as follows. The frame server 58 accepts the frame at the head of the particular queue which has the highest congestion severity status of all queues. If more than one queue has the highest congestion severity status, the queue associated with the highest priority level among the queues is served. The process of determining the congestion severity status for each queue is then repeated when the frame server 58 is ready to dispatch another frame.

Figure 6:
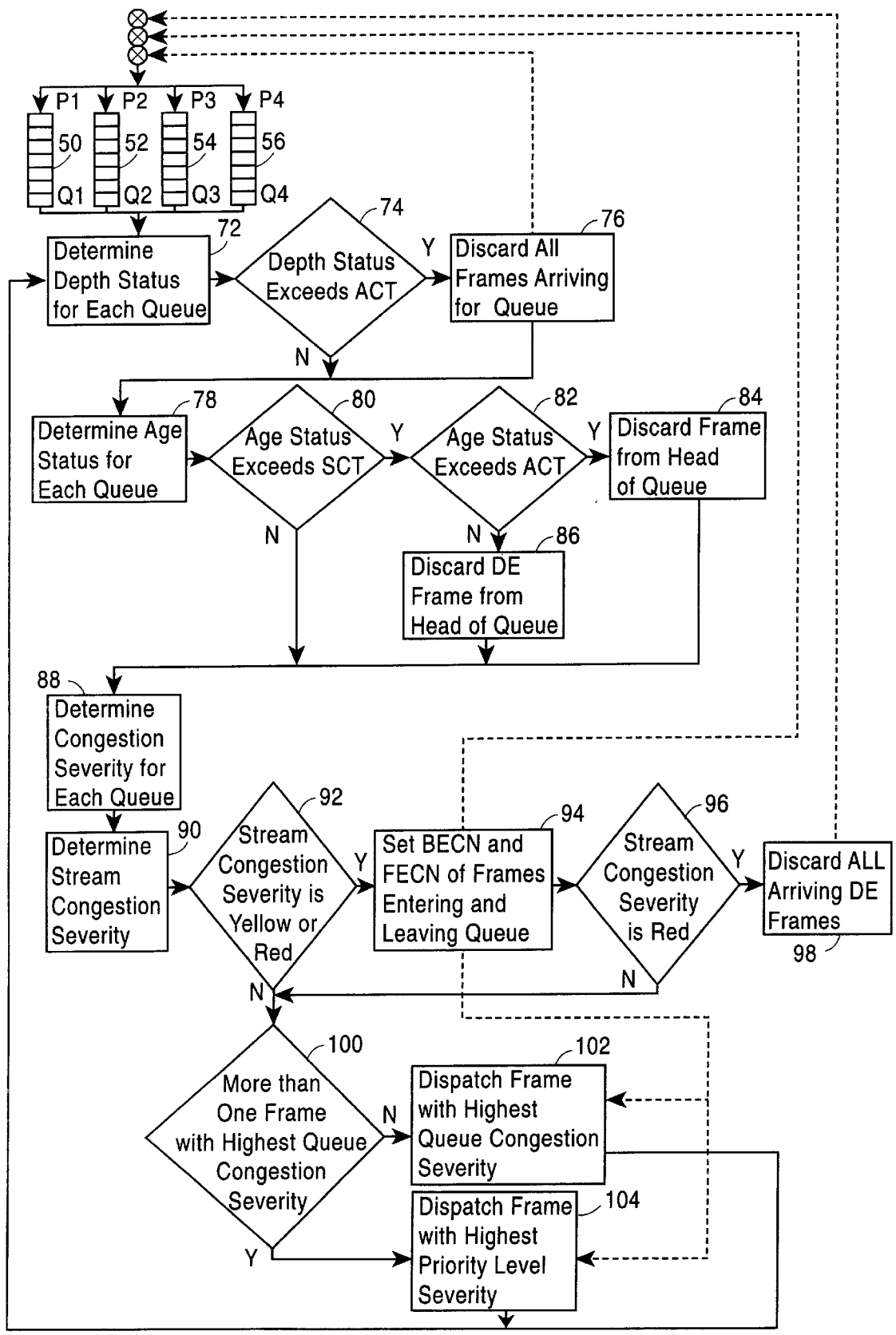
FIG. 6 is a flowchart showing the frame arbitration and congestion management steps of multiple priority queuing as illustrated in FIGS. 4 and 5.

With reference to FIG. 6, the method for queue service arbitration according to a preferred embodiment of the present invention is next described. Frame server 58 at step 72 first determines the depth severity status for each queue as previously described. Next, at step 74, it is determined whether or not the depth severity status for each queue exceeds the ACT delay congestion level. If so, all arriving frames for that particular queue will be discarded, as provided in step 76.

If the depth status of a queue does not exceed the ACT congestion level, the method proceeds to step 78, whereupon the age severity status for each queue is next determined. At step 80, it is determined whether or not the age status of each queue exceeds the SCT delay congestion level. If so, a further query is made at step 82 as to whether or not the age severity status of the queue exceeds the ACT delay congestion level. If step 82 provides an affirmative response, the frame in that particular queue is discarded as provided in step 84. On the other hand, if the query of step 82 is in the negative, the method proceeds to step 86, whereupon only a frame with its DE bit is discarded from the particular queue. If the age status does not exceed the SCT delay congestion level at step 80, step 88 is directly proceeded to.

Having determined both the depth status and the age status for each queue, the congestion severity for each of the queues is determined at step 88, in the manner discussed previously. At step 90, the stream congestion severity for the entirety of the queues is next determined in the manner previously described. At step 92, it is determined whether or not the stream congestion severity has a value of Yellow (Mid) or Red (High). If in the affirmative, at step 94 the BECN and FECN bits of frames entering and leaving the queues are set. As well, at step 96, if the stream congestion severity is Red (High) all arriving frames having a DE bit set are discarded, as provided for in step 98. If the stream congestion severity is neither Yellow or Red at step 92, the method proceeds directly to step 100.

At step 100, it is determined whether there exists more than one frame having the highest queue congestion severity. If not, at step 102 the frame server 58 dispatches the frame with the highest queue congestion severity. However, if there exists more than one frame with the highest queue congestion severity, this congestion severity tie will be resolved in favour of the highest priority level queue at step 104. Once a frame has been dispatched according to the foregoing procedure, execution returns to step 72 to begin the process anew.

The advantage of the foregoing queuing method is that if congestion occurs, the entire bandwidth is allocated to the highest priority conventions until the delay on the lower priority conventions becomes greater than a given threshold. When the delay of these lower priority connections becomes unacceptable, these lower priority connections receive the entire bandwidth, but only until the delay on the higher priority connections reaches an associated threshold. At that point, the bandwidth is reallocated back to the higher priority connections. Thus, the delay on the higher priority connections can never become greater than its associated threshold value no matter how congested the network node is with low priority connections, provided that the high priority connections do not exceed the bandwidth of the congestion point.

A further advantage of the queuing method according to the present invention occurs when the low priority connections have low utilization, but the higher priority connections use almost the entire available bandwidth. In this situation, the low priority frames will wait in their queue for a break in the high priority traffic. If such a break does not occur before the delay on the low priority traffic becomes unacceptable, the age status of the low priority queue will cause a brief pause in the high priority traffic, provided the delay on the high priority traffic remains acceptable, in order to allow the low priority traffic access to the bandwidth.

While the preferred embodiments of the apparatus and method of the present invention have been described with reference to four priority queues each having three applied congestion thresholds, those skilled in this art will appreciate that the invention may be adapted to any number of priority queues with any number of applied congestion thresholds. Likewise, while the congestion severity status of each queue has been described with reference to two components, namely depth severity and age severity, those skilled in this art will appreciate that the invention is adaptable to queue congestion severity which is comprised of only a single such component or more than two such components. Although the preferred embodiments of the apparatus and method of the invention have been described with reference to the servicing of message frames in a Frame Relay networking environment, those skilled in this art will understand that the invention may be employed to service other types of messages in other types of network environments as well.

Generally, the invention has been described herein by way of example only, and those skilled in this art will appreciate that various modifications of detail may be made to the invention, all of which come within its spirit and scope.

What is claimed:

1. A message service apparatus for a switching network, the message service apparatus comprising:
   (a) an input port for receiving messages from a plurality of network connections,
   (b) a plurality of message queues for storing said received messages, the queues respectively corresponding to each of a plurality of predetermined priority levels pertaining to said received messages, one of said priority levels being assigned to each network connection of said plurality of network connections, each queue having associated therewith at least one of a plurality of predetermined congestion thresholds whereby a congestion severity status may be determined for each queue, the congestion severity status corresponding proportionally to the number of said congestion thresholds which have been exceeded by the queue;
   (c) a processor for determining the network connection associated with each of said received messages, and for allocating each of said messages to a corresponding one of said queues based upon the priority level assigned to said determined network connection;
   (d) a server for the arbitration of messages from said queues, wherein said server determines said congestion severity status for each of said queues, identifies which of said queues has the highest congestion severity status, and determines whether more than one of said queues has been identified as having the highest congestion severity status, whereupon:
      (d.1) if only one queue has said highest congestion severity status, said server selects a next message to be dispatched from the queue having said highest congestion severity status and
      (d.2) if more than one queue has said highest congestion severity status, said server determines, from among those queues having said highest congestion severity status, which of said queues has the highest priority level, and said server instead selects said next message to be dispatched from the queue having said highest priority level; and
   (e) an output port for dispatching said messages selected from the queues by said server.

2. The apparatus according to claim 1, wherein said message queues are first-in first-out queues, each queue having a head and a tail thereof, said processor allocating said messages to the tail of said one of said corresponding queues, said server selecting each next message to be dispatched from the head of a queue which has been identified for service according to the procedure of step (d).

3. The apparatus according to claim 2, further comprising a storage device for storing said plurality of predetermined priority levels pertaining to said received messages.

4. The apparatus according to claim 3, wherein said plurality of predetermined priority levels consists of four priority levels and said apparatus provides four message queues.

5. The apparatus according to claim 4, wherein two predetermined congestion thresholds are applied to each of the queues.

6. The apparatus according to claim 5, wherein each congestion threshold is established in equivalent units of delay time and queue depth corresponding respectively to a delay congestion threshold and a depth congestion threshold, such that a delay congestion status and a depth congestion status may be determined for each queue, the delay congestion status corresponding proportionally to the number of delay congestion thresholds which have been exceeded by the queue and the depth congestion status corresponding proportionally to the number of depth congestion thresholds which have been exceeded by the queue, the number of exceeded delay congestion thresholds for a queue being determined on the basis of elapsed time from which a message at the head of said queue has been allocated to said queue, the number of exceeded delay congestion thresholds for a queue being determined on the basis of message depth within said queue, and wherein said congestion severity status for each queue is determined as the highest of the delay congestion status and the age congestion status for that queue when each such status is not the same, and as either of the delay congestion status and the age congestion status when each such status is the same.

7. The apparatus according to claim 6, further comprising a timer for time stamping each of the messages received from said input port prior to said messages being allocated to said corresponding queue, the time stamping thereby enabling a determination of said elapsed time.

8. The apparatus according to claim 7, wherein said switching network is a Frame Relay network and said messages are message frames.

9. The apparatus according to claim 8, wherein the predetermined congestion thresholds for each queue correspond to mild congestion threshold (MCT) and severe congestion threshold (SCT) for a network connection associated with said queue.

10. The apparatus according to claim 9, wherein said storage device is a lookup table.

11. A method for servicing messages received from a plurality of network connections in a switching network, the method comprising the steps of (a) determining the network connection associated with each of said received messages;

(b) allocating each of said received messages to a corresponding one of a plurality of message queues, the queues respectively corresponding to each of a plurality of predetermined priority levels pertaining to said received messages, one of said priority levels being assigned to each of said network connections, each queue having associated therewith at least one of a plurality of predetermined congestion thresholds, the received messages being allocated to said corresponding one of said queues based upon the predetermined priority level assigned to said determined network connection;

(c) determining a congestion severity status for each of said queues prior to each dispatch of a message therefrom, the congestion severity status corresponding proportionally to the number of said congestion thresholds which have been exceeded by the queue;

(d) identifying which of said queues has the highest congestion severity status;

(e) determining whether more than one of said queues has been identified as having the highest congestion severity status, and (e.1) if only one queue has said highest congestion severity status, said server selects a next message to be dispatched from the queue having said highest congestion severity status, and (e.2) if more than one queue has said highest congestion severity status said server determines, from among those queues having said highest congestion severity status, which of said queues has the highest priority lever, and said server instead selects said next message to be dispatched from the queue having said highest priority level and;

(f) dispatching said selected message from the queue.

12. The method according to claim 11, wherein said message queues are first-in first-out queues, each queue having a head and a tail thereof, said received messages being allocated to the tail of said corresponding one of said queues based upon the predetermined priority level assigned to said determined network connection, said next message to be dispatched being selected from the head of a queue which has been identified for service according to the procedure of step (e).

13. The method according to claim 12, wherein said plurality of predetermined priority levels consists of four priority levels and wherein four message queues are provided.

14. The method according to claim 13, wherein two predetermined congestion thresholds are associated with each queue.

15. The method according to claim 14, wherein each congestion threshold is established in equivalent units of delay time and queue depth corresponding respectively to a delay congestion threshold and a depth congestion threshold, such that a delay congestion status and a depth congestion status may be determined for each queue, the delay congestion status corresponding proportionally to the number of delay congestion thresholds which have been exceeded by the queue and the depth congestion status corresponding proportionally to the number of depth congestion thresholds which have been exceeded by the queue, the number of exceeded delay congestion thresholds for a queue being determined on the basis of elapsed time from which a message stored at the head of said queue has been allocated to said queue, the number of exceeded delay congestion thresholds for a queue being determined on the basis of message depth within said queue, and wherein said congestion severity status for each queue is determined as the highest of the delay congestion status and the age congestion status of that queue when each such status is not the same, and as either of the delay congestion status and the age congestion status when each such status is the same.

16. The method according to claim 15, wherein each message is time stamped prior to being allocated to a corresponding one of said queues, to thereby enable computation of said elapsed time.

17. The method according to claim 16, wherein said switching network is a Frame Relay network and said messages are message frames.

18. The method according to claim 17, wherein the predetermined congestion thresholds for each queue correspond to mild congestion threshold (MCT) and severe congestion threshold (SCT) for a network connection associated with said queue.

19. The method according to claim 18, wherein said plurality of predetermined priority levels is stored in a lookup table.

20. An apparatus for servicing messages received from a plurality of network connections in a switching network, the apparatus comprising;

(a) means for determining the network connection associated with each of said received messages;

(b) means for allocating each of said received messages to a corresponding one of a plurality of message queues, the queues respectively corresponding to each of a plurality of predetermined priority levels pertaining to said received messages, one of said priority levels being assigned to each of said network connections, each queue having associated therewith at least one of a plurality of predetermined congestion thresholds, the received messages being allocated to said corresponding one of said queues based upon the predetermined priority level assigned to said determined network connection, (c) means for determining a congestion severity status for each of said queues prior to each dispatch of a message therefrom, the congestion severity status corresponding proportionally to the number of said congestion thresholds which have been exceeded by the queue, wherein means for determining identifies which of said queues has the highest congestion severity status and determines whether more than one of said queues has been identified as having the highest congestion severity status;

(d) means for selecting a next message to be dispatched from said queues wherein:
   (d.1) if only one queue has said highest congestion severity status, said server selects a next message to be dispatched from the queue having said highest congestion severity status and,
   (d.2) if more than one queue has said highest congestion severity status, said server determines, from among those queues having said highest congestion severity status, which of said queues has the highest priority level, and said server instead selects said next message to be dispatched from the queue having said highest priority level, and (e) means for dispatching said selected message from the queue.

\* \* \* \* \*